United States Patent
Ohsaki et al.

(10) Patent No.: US 9,120,032 B2
(45) Date of Patent: Sep. 1, 2015

(54) MICROCHIP, MICROCHIP DEVICE, AND EVAPORATION OPERATION METHOD USING THE MICROCHIP

(75) Inventors: Katsuhiko Ohsaki, Tokyo (JP); Shigeki Yamazaki, Tokyo (JP); Takehiko Kitamori, Kanagawa (JP); Masaharu Ueno, Kanagawa (JP); Kazuma Mawatari, Kanagawa (JP); Yoshikuni Kikutani, Kanagawa (JP)

(73) Assignees: JFE ENGINEERING CORPORATION, Tokyo (JP); KANAGAWA ACADEMY OF SCIENCE AND TECHNOLOGY, Kawasaki-shi, Kanagawa (JP)

( * ) Notice: Subject to any disclaimer, the term of this patent is extended or adjusted under 35 U.S.C. 154(b) by 630 days.

(21) Appl. No.: 12/734,384

(22) PCT Filed: Oct. 30, 2008

(86) PCT No.: PCT/JP2008/069755
§ 371 (c)(1),
(2), (4) Date: Apr. 29, 2010

(87) PCT Pub. No.: WO2009/057693
PCT Pub. Date: May 7, 2009

(65) Prior Publication Data
US 2010/0247429 A1    Sep. 30, 2010

(30) Foreign Application Priority Data
Nov. 1, 2007    (JP) .................................. 2007-285012

(51) Int. Cl.
*B01D 1/00* (2006.01)
*B01D 1/14* (2006.01)
(Continued)

(52) U.S. Cl.
CPC ................ *B01D 1/0082* (2013.01); *B01D 1/14* (2013.01); *B01D 1/221* (2013.01); *B01J 19/0093* (2013.01);
(Continued)

(58) Field of Classification Search
USPC .................................. 203/49; 159/16.1, 47.1
See application file for complete search history.

(56) References Cited
U.S. PATENT DOCUMENTS 4,418,039 A * 11/1983 Adler .............................. 422/82
5,209,904 A * 5/1993 Forney et al. .................. 422/73
(Continued)

FOREIGN PATENT DOCUMENTS

| JP | 01-203038 A | 8/1989 |
| JP | 2005-062186 | 3/2005 |

(Continued)

OTHER PUBLICATIONS

English-language International Preliminary Report on Patentability and Written Opinion of the International Searching Authority, dated Jun. 1, 2010 for International Application PCT/JP2008/069755 filed Oct. 30, 2008; Applicant: JFE Engineering Corporation et al.
(Continued)

*Primary Examiner* — Jennifer Wecker
(74) *Attorney, Agent, or Firm* — Holtz, Holtz, Goodman & Chick PC

(57) ABSTRACT

Provided is a microchip capable of integrating liquid evaporation as an operation on the microchip. In the microchip 10 having a gas flow path 13 inside, liquid is dispersed by capillary action and pooled in a pool portion 12 at a bottom of the gas flow path 13, and at least a part of the liquid pooled in the pool portion 12 is evaporated. As the capillary action is used, the liquid can be dispersed and pooled in the pool portion 12 at the bottom of the gas flow path 13 inside the microchip 10. Besides, the liquid pooled in the pool portion 12 remains in the pool portion by a surface tension even if gas is made to flow in the gas flow path 13 or the gas flow path is evacuated for evaporation. This enables highly efficient evaporation inside the microchip 10.

23 Claims, 4 Drawing Sheets

(51) Int. Cl.
    *A61K 51/00*     (2006.01)
    *B01J 10/00*     (2006.01)
    *B01D 3/00*     (2006.01)
    *B01D 1/22*     (2006.01)
    *B01J 19/00*     (2006.01)
    *B01D 1/02*     (2006.01)
    *G01N 33/00*     (2006.01)
    *B01D 3/34*     (2006.01)
    *B01L 3/00*     (2006.01)

(52) U.S. Cl.
CPC ............... *B01J 2219/00837* (2013.01); *B01J 2219/00873* (2013.01); *B01L 3/5027* (2013.01); *B01L 2200/0678* (2013.01); *B01L 2300/161* (2013.01); *B01L 2400/04* (2013.01); *B01L 2400/0406* (2013.01); *B01L 2400/0466* (2013.01)

(56) References Cited

U.S. PATENT DOCUMENTS

| | | | |
|---|---|---|---|
| 6,319,719 | B1 | 11/2001 | Bhullar et al. |
| 6,932,951 | B1 * | 8/2005 | Losey et al. ............... 422/211 |
| 7,518,108 | B2 * | 4/2009 | Frey et al. ............... 250/288 |
| 7,998,418 | B1 * | 8/2011 | Matteo ............... 422/528 |
| 8,075,851 | B2 * | 12/2011 | Elizarov et al. ............... 422/502 |
| 2003/0036206 | A1 * | 2/2003 | Chien et al. ............... 436/180 |
| 2004/0099310 | A1 * | 5/2004 | Andersson ............... 137/240 |
| 2005/0249641 | A1 * | 11/2005 | Blankenstein et al. ....... 422/102 |
| 2006/0016215 | A1 | 1/2006 | Tonkovich et al. |
| 2006/0043284 | A1 | 3/2006 | Baba et al. |
| 2006/0081340 | A1 * | 4/2006 | Kneebone ............... 159/1.1 |
| 2006/0268661 | A1 * | 11/2006 | Ferren et al. ............... 367/13 |
| 2008/0275653 | A1 | 11/2008 | Cypes et al. |
| 2008/0281090 | A1 * | 11/2008 | Lee et al. ............... 536/122 |
| 2008/0305011 | A1 * | 12/2008 | Hwang et al. ............... 422/100 |
| 2009/0095057 | A1 * | 4/2009 | Staats ............... 73/64.56 |
| 2009/0263288 | A1 | 10/2009 | Suzuki et al. |
| 2011/0120956 | A1 | 5/2011 | Ivantar et al. |
| 2011/0223654 | A1 * | 9/2011 | Holman et al. ............ 435/288.7 |

FOREIGN PATENT DOCUMENTS

| | | |
|---|---|---|
| JP | 2005/066382 A | 3/2005 |
| JP | WO 2005-520827 | 7/2005 |
| JP | 2006/075680 A | 3/2006 |
| JP | 2006-527367 | 11/2006 |
| JP | 2007-63150 A1 | 3/2007 |
| JP | 2007-101240 | 4/2007 |
| JP | 2007/136280 A | 6/2007 |
| JP | 2007136280 A * | 6/2007 |
| JP | 2008-134126 | 6/2008 |
| JP | 2010-531295 A | 9/2010 |
| JP | 2010-536540 A | 12/2010 |
| WO | WO 03/076038 A1 | 9/2003 |
| WO | WO 03/078358 A2 | 9/2003 |
| WO | WO 03/078358 A3 | 9/2003 |
| WO | WO 2004/051228 A1 | 7/2004 |
| WO | WO 2004/093652 A2 | 11/2004 |
| WO | WO 2004/093652 A3 | 11/2004 |
| WO | 2007033335 A1 | 3/2007 |
| WO | 2007049559 A1 | 5/2007 |
| WO | 2007077627 A1 | 6/2007 |
| WO | WO 2008/128201 A1 | 10/2008 |

OTHER PUBLICATIONS

Notification of Reasons for Refusal (Office Action) mailed Aug. 20, 2013 for JP 2009-082718, along with an English-language translation.

Notification of Reasons for Refusal (Office Action) mailed Aug. 20, 2013 for JP 2009-082717, along with an English-language translation.

Extended European Search Report dated Jun. 22, 2015, issued in counterpart European Application No. 08845767.6.

* cited by examiner

MICROCHIP, MICROCHIP DEVICE, AND EVAPORATION OPERATION METHOD USING THE MICROCHIP

This application is a U.S. National Phase Application under 35 USC 371 of International Application PCT/JP2008/069755, filed Oct. 30, 2008, which is incorporated herein in its entirety by this reference.

TECHNICAL FIELD

The present invention relates to a microchip and a microchip device that enable evaporation.

BACKGROUND ART

Recently, studies of a micro chemical system utilizing micro-space features have been developed in various fields and a highly-efficient micro chemical system is being constructed which combines plural unit operations such as mixing, extracting, phase separation and the like.

In such a micro chemical system, it has been proposed that reaction is also conducted in a micro reaction flow path. When the chemical reaction is performed using the micro reaction flow path, such a micro flow path is formed in a microchip and sample fluids are mixed in the flow path thereby to perform chemical reaction. This microchip is typically a thin board that has a thickness of several millimeters and has the flow path formed in. Advantageously, it is excellent in heat dissipation, temperature control easiness and small use amounts of sample fluid and reaction solvent.

In addition, an attempt has been made to integrate and perform multi-stage reaction operations in the microchip. One of such applications is synthesis of radiopharmaceuticals used in PET (Positron emission tomography), which is usually conducted at multiple stages. When a radioactive precursor is liquid, it is supplied in form of an aqueous solution. However, organic reaction is often anhydrous reaction that hates water and in order to realize organic reaction, the aqueous solution needs to be exchanged into an organic solvent solution. Besides, as medical agents to be applied to human bodies are finally aqueous solutions, the organic solvent solution needs to be exchanged to an aqueous solution again.

These solvent exchanges are generally conducted by removing a solvent by evaporation and then introducing a new solvent desired to be exchanged. However, this evaporation is difficult to be performed inside the microchip. In the related art, evaporation is performed in a standard container and not in the microchip.

An example of synthesis of radiopharmaceuticals using a microchip is shown in the patent documents 1 and 2, in which, however, reaction is only performed in the chip and evaporation is not performed. Integration of all the steps on the chip has not been realized yet.

First experiment of integration of all the steps of synthesis of radiopharmaceuticals into the microchip is disclosed in the non-patent document 1. In this example, evaporation is an operation through a gas permeation membrane. Therefore, evaporation takes much time even with a small amount of liquid, and the evaporation cannot be performed effectively.

Like this example, synthesis of radiopharmaceuticals is batch synthesis, which needs to pool a batch amount in the microchip. However, the space inside the microchip is an area dominated by the surface tension rather than the gravity, and unless the gas permeation membrane is used, it is difficult to disperse and pool the batch amount in the microchip space.

Besides, in the synthesis of radiopharmaceuticals, there is an operation of distilling a target material by the evaporation of the liquid and transferring it to a next reaction. However, these steps have never been performed in the chip.

As an attempt to perform evaporation in a microchip, there is proposed a method disclosed in the patent document 3. In this evaporation method, as illustrated in FIG. 5, a microchip 1 is used having a gas flow path 2 and a liquid flow path 3 worked asymmetrically therein. Gas and liquid are made to flow into the asymmetrical gas flow path 2 and liquid flow path 3 and the liquid is evaporated from a boundary face between the gas and the liquid. However, a stable flow rate for liquid is limited to about 0.1 μL/min and problematically, concentration of the liquid takes much time. Besides, as the evaporation is performed by making the liquid flow into the liquid flow path 3 and simultaneously concentrating the liquid, it is not suitable for batch synthesis of radiopharmaceuticals or the like.

[Patent Document 1] Japanese Patent Application Laid-Open No. 2005-520827
[Patent Document 2] Japanese Patent Application Laid-Open No. 2006-527367
[Patent Document 3] International Publication No. WO2003/076038, pamphlet
[Non-Patent Document 1] SCIENCE VOL310 16 Dec. 2005

DISCLOSURE OF THE INVENTION

Problems to be Solved by the Invention

Thus, the effective evaporation of liquid has not been realized in the conventional microchip.

In the applicants' attempt, as illustrated in FIG. 6, liquid 7 is dispersed onto the bottom of a microchip internal space 6 and gas is made to flow over the liquid 7 thereby to evaporate the liquid 7. However, In the micro space, the surface tension is dominant over the gravity. Therefore, as illustrated in FIG. 7, the liquid is gathered in bulks in the microchip internal space 6 (that is, the liquid 7 exists in bulk extending from the bottom surface of the flow path of the microchip to the ceiling). Even when the gas is made to flow into the flow path of the microchip, the liquid moves still in bulk and is not evaporated.

The present invention was made in view of the foregoing and has an object to integrate the evaporation of the liquid as an operation on the microchip. More specifically, the present invention has an object to provide new microchip, microchip device and evaporation method using the microchip for a multiple-step synthesis operation including an evaporation step such as synthesis of radiopharmaceuticals.

Means for Solving the Problems

In order to solve the above-mentioned problems, a first aspect of the present invention is a microchip comprising a gas flow path inside, the gas flow path having a pool portion at a bottom thereof for pooling liquid that is dispersed by capillary action, and at least a part of the liquid pooled in the pool portion being evaporated.

A second aspect of the invention is characterized in that, in the microchip according to the first aspect of the invention, the pool portion comprises a groove formed in a bottom surface of the gas flow path.

A third aspect of the invention is characterized in that, in the microchip according to the second aspect of the invention, the groove comprises a plurality of grooves arranged in parallel with each other.

A fourth aspect of the invention is characterized in that, in the microchip according to the second or third aspect of the invention, the microchip has a board in which the groove is formed, side walls each provided on an upper surface of the board and a cover provided on an upper surface of the side wall, and the board, the side walls and the cover make up the gas flow path.

A fifth aspect of the invention is characterized in that, in the microchip according to any one of the first to fourth aspects of the invention, the liquid is a solution in which a solute is dissolved in a solvent and the solvent pooled in the pool portion is evaporated to dry and harden the solute in the pool portion.

A sixth aspect of the invention is characterized in that, in the microchip according to any one of the first to fifth aspects of the invention, when the liquid used is a polar solvent, at least a part of the gas flow path is subjected to hydrophobic treatment.

A seventh aspect of the invention is characterized in that, in the microchip according to any one of the first to sixth aspects of the invention, when the liquid used is a polar solvent, at least a part of the pool portion is subjected to hydrophilic treatment.

An eighth aspect of the invention is characterized in that, in the microchip according to any one of the first to fifth aspects of the invention, when the liquid used is a nonpolar solvent, at least a part of the gas flow path is subjected to hydrophilic treatment.

A ninth aspect of the invention is characterized in that, in the microchip according to any one of the first to fifth and eighth aspects of the invention, when the liquid used is a nonpolar solvent, at least a part of the pool portion is subjected to hydrophobic treatment.

A tenth aspect of the invention is a microchip device comprising: a microchip having a gas flow path inside, the gas flow path having a pool portion at a bottom thereof for pooling liquid that is dispersed by capillary action, and at least a part of the liquid pooled in the pool portion being evaporated; an inlet path for introducing gas into the gas flow path and introducing the liquid to the pool portion; and an outlet path for discharging the gas from the gas flow path and discharging the liquid from the pool portion.

An eleventh aspect of the invention is characterized in that, in the microchip device according to the tenth aspect of the invention, the pool portion is a groove formed in a bottom surface of the gas flow path.

A twelfth aspect of the invention is characterized by, in the microchip device according to the tenth or eleventh aspect of the invention, further comprising: a fluid control mechanism for supplying the gas or liquid to the inlet path of the microchip, the liquid pooled in the pool portion being evaporated while the gas is made to flow into the gas flow path.

A thirteenth aspect of the invention is characterized by, in the microchip device according to the tenth or eleventh aspect of the invention, further comprising a heating mechanism for heating at least a part of the microchip, the liquid pooled in the pool portion being evaporated while heating at least the part of the microchip.

A fourteenth aspect of the invention is characterized by, in the microchip device according to the tenth or eleventh aspect of the invention, further comprising a vacuum suction mechanism for removing gas in the gas flow path of the microchip by suction, the liquid pooled in the pool portion being evaporated while removing the gas in the gas flow path by suction.

A fifteenth aspect of the invention is an evaporation method comprising the steps of: using a microchip that has a gas flow path inside, the gas flow path having a pool portion at a bottom thereof for pooling liquid that is dispersed by capillary action; and evaporating at least a part of the liquid pooled in the pool portion.

A sixteenth aspect of the invention is characterized in that, in the evaporation method according to the fifteenth aspect of the invention, the pool portion is a groove formed in a bottom surface of the gas flow path.

A seventeenth aspect of the invention is characterized in that, in the evaporation method according to the fifteenth or sixteenth aspect of the invention, the liquid pooled in the pool portion is evaporated while gas is introduced into the gas flow path and made to flow in the gas flow path.

An eighteenth aspect of the invention is characterized in that, in the evaporation method according to the fifteenth or sixteenth aspect of the invention, the liquid pooled in the pool portion is evaporated while at least a part of the microchip is heated.

A nineteenth aspect of the invention is characterized in that, in the evaporation method according to the fifteenth or sixteenth aspect of the invention, the liquid pooled in the pool portion is evaporated while gas in the gas flow path of the microchip is removed by suction.

A twentieth aspect of the invention is a method for producing a solution of radiolabelled compound, comprising the steps of: using a microchip that has a gas flow path inside, the gas flow path having a pool portion at a bottom thereof for pooling liquid that is dispersed by capillary action; and evaporating the solution of radiolabelled compound pooled in the pool portion.

A twenty-first aspect of the invention is a method for producing a solution of radiolabelled compound, comprising the steps of: using a microchip that has a gas flow path inside, the gas flow path having a pool portion at a bottom thereof for pooling liquid that is dispersed by capillary action; and drying and hardening the solution of radiolabelled compound pooled in the pool portion.

A twenty-second aspect of the invention is a method for producing a solution of radiolabelled compound, comprising the steps of: using a microchip that has a gas flow path inside, the gas flow path having a pool portion at a bottom thereof for pooling liquid that is dispersed by capillary action; and removing a solvent from the solution of radiolabelled compound pooled in the pool portion.

A twenty-third aspect of the invention is characterized in that, in the method according to the twenty-second aspect of the invention, a new solvent or solution is introduced into the pool portion to exchange the solvent of the radioactive chemical material pooled in the pool portion.

A twenty-fourth aspect of the invention is characterized in that, in the method according to the twenty-second aspect of the invention, a new solution is introduced into the pool portion to make the radioactive chemical material pooled in the pool portion react with the new solution.

A twenty-fifth aspect of the invention is a method for producing a solution of radiolabelled compound, comprising the steps of: using a microchip that has a gas flow path inside, the gas flow path having a pool portion at a bottom thereof for pooling liquid that is dispersed by capillary action; and distilling the solution of radiolabelled compound pooled in the pool portion.

EFFECTS OF THE INVENTION

According to the present invention, use of the capillary action allows the liquid to be dispersed and pooled in the pool portion at the bottom of the gas flow path in the microchip. Besides, even when gas is made to flow into the gas flow path for evaporation or the flow path is evacuated, the liquid pooled in the pool portion remains there due to the surface tension. As the highly-efficient evaporation can be achieved inside the microchip, it is possible to integrate the steps that need evaporation such as solvent exchange and distillation onto the microchip.

REFERENCE NUMERALS

Figure 1:
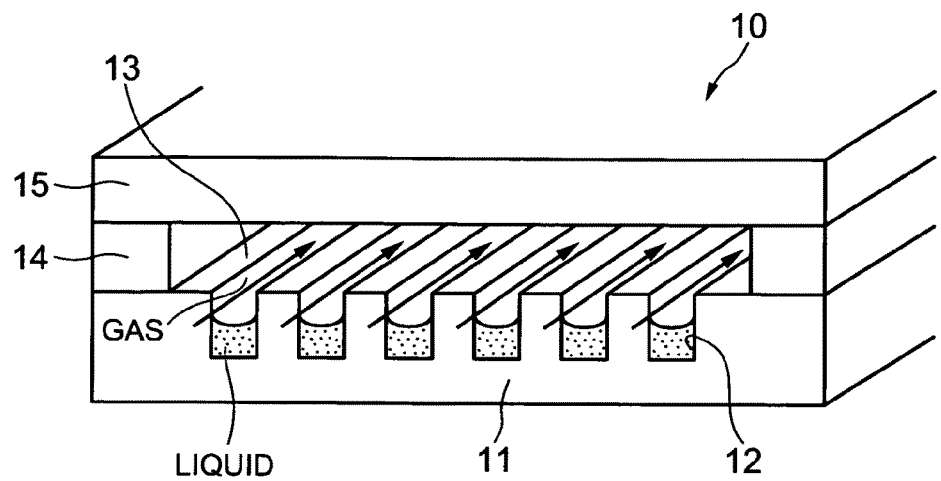
FIG. 1 is a conceptual view of a microchip according to an exemplary embodiment of the present invention.

10 ... microchip
11 ... board
12 ... microfabricated groove (groove, pool portion)
12a ... groove (pool portion)
13 ... gas flow path
14 ... middle plate (side wall)
15 ... cover upper plate (cover)
18 ... inlet path
19 ... outlet path
20 ... heater (heating mechanism)
21 ... vacuum suction mechanism
22 ... fluid control mechanism

MODE FOR CARRYING OUT THE INVENTION

An embodiment of the present invention will be described below. In the embodiment, as a basic operation, capillary action is used to disperse the liquid into grooves formed in the bottom surface of the gas flow path of the microchip and the liquid is pooled in the grooves thereby to perform evaporation. This evaporation is an operation in a gas flow path (micro channel) of the microchip that is a small and limited space, and has a principle feature that the specific interfacial area is large and the evaporation is speedy by dispersing the liquid in the microchip.

FIG. 1 is a conceptual view of a microchip 10 according to an exemplary embodiment of the present invention. On an upper surface of a board 11 made of glass, ceramics, silicon or resin, a plurality of microfabricated grooves 12 is formed as pool portions by micro fabrication. These microfabricated grooves 12 are formed, for example, by drilling, laser beam machining, etching or the like. The microfabricated grooves 12 are arranged in parallel with each other at fixed intervals. Into these microfabricated grooves 12, the liquid is introduced by the capillary action. Then, gas is introduced onto the liquid in the space inside the microchip 10.

There is no specific restriction as to the size and length of the microfabricated grooves 12, however, they can be determined appropriately so that the grooves 12 may constitute a micro chemical system on the microchip 10 and the capillary action may be exerted. For example, in a cross-sectional view taken along the line orthogonal to the flow direction of the microfabricated grooves 12, the width of each microfabricated groove is about 500 μm or less and the depth is about 700 μm or less as practical standard.

The microchip 10 has a gas flow path 13 inside. On the board 11 where the microfabricated grooves 12 are formed, a middle plate 14 is provided as a side wall. On the upper surface of the middle plate 14, a cover upper plate 15 is provided as a cover. These board 11, middle plate 14 and cover upper plate 15 form the gas flow path 13. The cover upper plate 15 is arranged over the gas flow path 13 for the gas flow so that the gas and the liquid are prevented from being scattered and lost.

The liquid remains in the microfabricated grooves 12 by the capillary action and dispersed in the microchip 10. Therefore, the liquid is not discharged via an outlet path of the gas even if no gas permeation membrane is provided at the outlet path. In the microfabricated grooves 12, at least a part of the liquid is evaporated and discharged via the outlet path of the gas. However, if the gas permeation membrane is provided, the gas permeation membrane is not blocked by the liquid and therefore, effective evaporation can be achieved.

Figure 2:
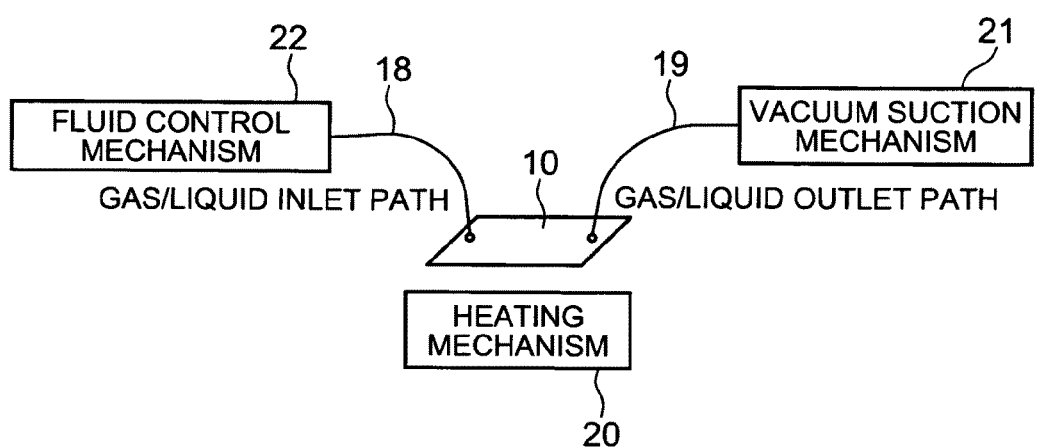
FIG. 2 is a conceptual view of a microchip device according to an exemplary embodiment of the present invention.

FIG. 2 is a conceptual view of a microchip device according to an exemplary embodiment of the present invention. A gas/liquid inlet path 18 and a gas/liquid outlet path 19 are arranged on the microchip 10. The gas/liquid inlet path and the gas/liquid outlet path may be provided as one path, or a liquid inlet path and a liquid outlet path may be provided as one path.

The evaporation is performed by heating at least a part of the microchip 10. For such heating, various mechanisms are considered. However, in view of the device structure and heating operability, it is preferable that a heater 20 is provided as a heating mechanism at a back surface side of the board 11 with the microfabricated grooves 12 (that is, bottom surface of the board 11) or a surface side of the cover upper plate 15.

The evaporation is thought to be performed by making the gas flow into the gas flow path 13 of the microchip 10 or decreasing the pressure of the gas flow path 13 of the microchip 10 by a vacuum suction mechanism 21 such as a vacuum pump.

Introduction of gas and liquid is performed by using a fluid control mechanism 22 such as a syringe pump or gas pressure pump. The gas is, for example, He. The fluid control mechanism 22 controls the amount of He that flows into the gas flow path 13 of the microchip 10. The introduction amount of liquid is preferably less than the capacity of the microfabricated grooves 12 so as to achieve effective evaporation, however, even if it is greater than the capacity of the microfabricated grooves 12, the fluid is not discharged via the outlet path and the evaporation can be performed well. Alternatively, the evaporation can be performed continuously by controlling the introduction speed of the fluid in such a manner that the fluid amount always falls within the capacity of the microfabricated grooves 12.

For example, evaporation performed by making the gas flow into the gas flow path of the microchip 10 is performed as follows: First, the fluid control mechanism 22 supplies the liquid via the inlet path 18 to the flow path of the microchip 10. The liquid supplied to the flow path 13 flows in the microfabricated grooves 12 in the bottom surface of the flow path 13 by the capillary action and is dispersed in the bottom of the flow path 13. Once the liquid is pooled in the microfabricated grooves 12, the fluid control mechanism 22 stops supplying of the liquid and makes the gas flow in a space above the liquid. Once the gas flows, the liquid is evaporated. An evaporated component of the liquid is discharged, together with the gas, from the outlet path 19. As the evaporation goes on, a solute in the liquid is dried and hardened so that the surfaces of the microfabricated grooves 12 are coated with the solute. In exchange of the solvent, a new solvent is introduced into the flow path 13 and the hardened solute may only be dissolved in the solvent. In order to take out the liquid after exchange of the solvents, the flow path 13 is entirely filled with the liquid.

Thus, as highly-efficient evaporation is achieved on the microchip 10, it is possible to integrate steps involving evaporation such as solvent exchange and distillation.

The microchip 10 of this embodiment is used in evaporation of the micro chemical system and suitably used in synthesis of radioactive chemical solution such as FDG (18F-fluorodeoxy glucose) used in PET. Synthesis of solution of radiolabelled compound is usually performed at plural steps. When the radioactive precursor is liquid, it is supplied in the form of solution. However, organic reaction (particularly, labeling reaction) is often anhydrous reaction that hates water and in order to realize organic reaction, the aqueous solution needs to be exchanged into an organic solvent solution. Besides, as medical agents to be applied to human bodies are finally aqueous solutions, the organic solvent solution needs to be exchanged to an aqueous solution again. This solvent exchange is performed by introducing a solution to exchange into the microfabricated grooves 12 after removing the solvent by evaporation in the microfabricated grooves 12. If heating is performed after exchange of the solvents, it can react with a solute of the solution of radiolabelled compound. With use of the microchip 10 of this embodiment, solvent exchange for synthesis of the solution of radiolabelled compound can be performed on the microchip 10.

In addition, after distillation of solution of radiolabelled compound in the microfabricated grooves 12, the distilled gas may be gathered in a solvent or solution to obtain the solution of radiolabelled compound.

Figure 3A:
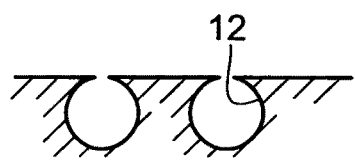
FIGS. 3A to 3C are views each illustrating a modification of microfabricated grooves.
Figure 3B:
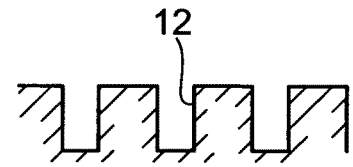
Figure 3C:
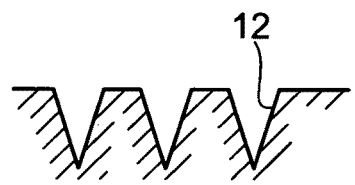

FIG. 3 illustrates another example of cross section of the microfabricated grooves 12. The cross section of each microfabricated groove 12 may be circular as illustrated in FIG. 3A, rectangular as illustrated in FIG. 3B or triangular as illustrated in FIG. 3C. However, the dimensions of the microfabricated groove 12 need to be such that the liquid can be dispersed by the capillary action.

Here, when polar solvent is used as liquid, hydrophobic treatment is performed on the gas flow path 13 and hydrophilic treatment is performed on the microfabricated grooves 12 as pool portion so as to prevent the liquid from flowing into the gas flow path 13. In addition, when nonpolar solvent is used as liquid, the hydrophilic treatment is performed on the gas flow path 13 and the hydrophobic treatment is performed on the microfabricated grooves 12 as pool portion so as to prevent the liquid from flowing into the gas flow path 13. The hydrophilic treatment includes sandblast treatment, oxygen plasma treatment, etc., and the hydrophobic treatment includes fluorine coating, surface treatment with silane coupling agents such as ODS (OctaDecylSilyl), etc.

EXAMPLES

The following description is made about an example to explain the microchip 10 in more detail. Needless to say, the following example is not intended for limiting the invention.

Figure 4A:
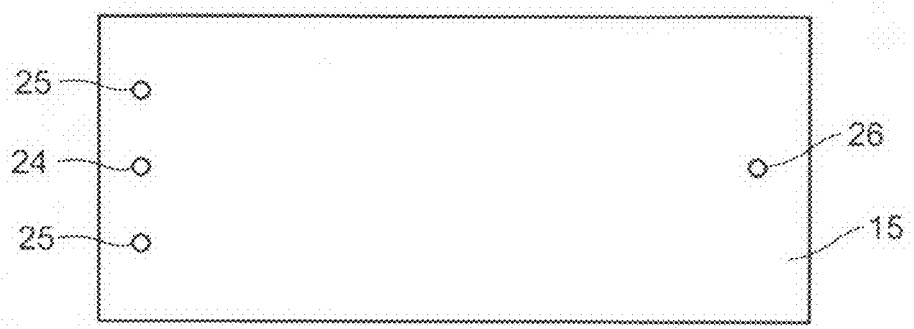
FIGS. 4A to 4C are exploded views of a microchip example (FIG. 4A illustrating a cover upper plate, FIG. 4B illustrating a middle plate and FIG. 4C illustrating a board)
Figure 4B:
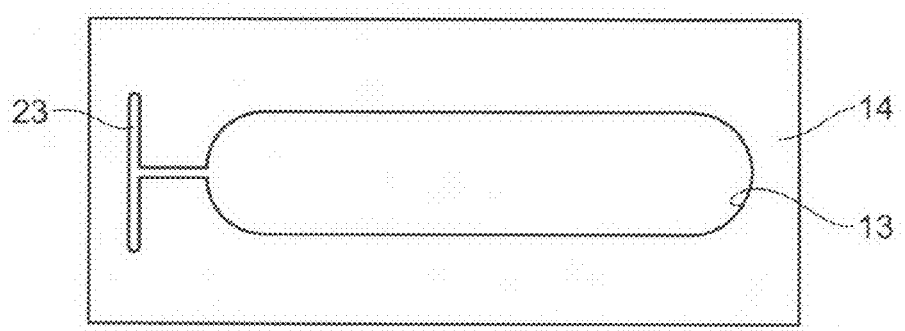
Figure 4C:
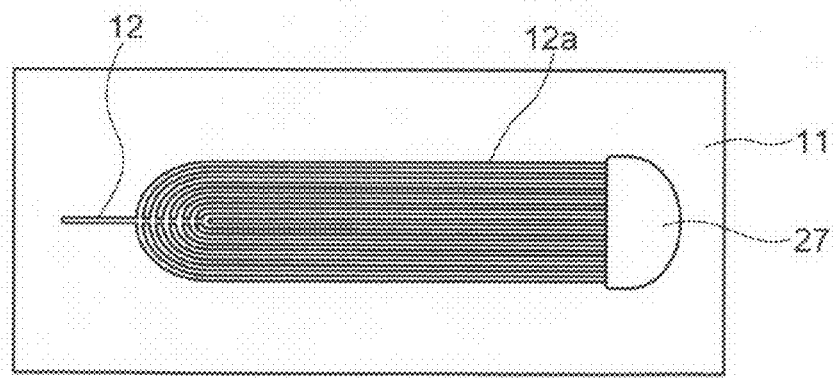
Figure 5A:
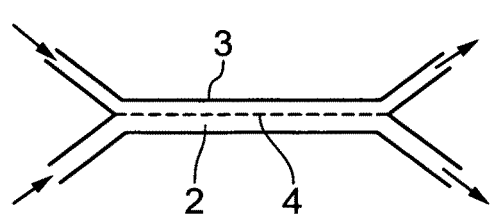
FIGS. 5A and 5B illustrate a microchip used in a conventional evaporation method (FIG. 5A being a plan view of a gas flow path and a liquid flow path, and FIG. 5B being a cross sectional view of the gas flow path and the liquid flow path)
Figure 5B:
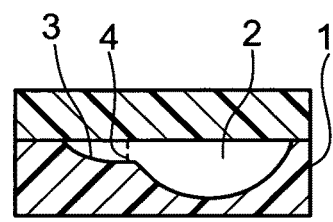
Figure 6:
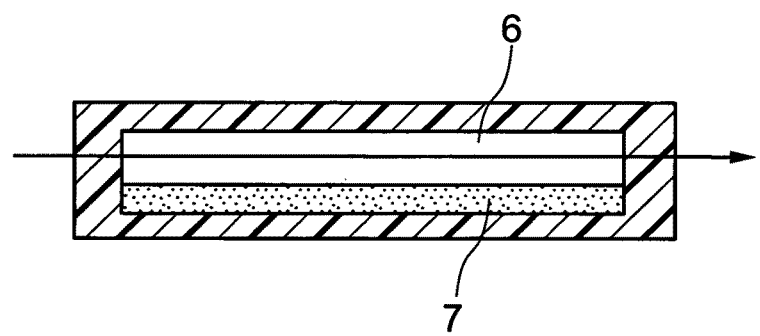
FIG. 6 illustrates liquid ideally pooled at a bottom of the flow path of the microchip.
Figure 7:
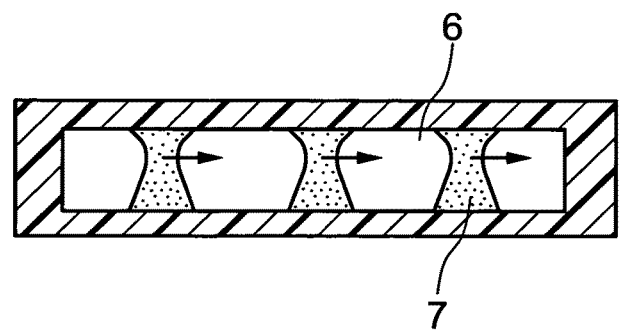
FIG. 7 illustrates liquid pooled in bulks in the flow path of the microchip.

FIGS. 4A to 4C are exploded views of the microchip 10. The microchip 10 has a board 11 in which grooves are formed, a middle plate 14 in which a flow path 13 and a supply path 23 for supplying gas and liquid to the flow path 13 are formed, and a cover upper plate 15 in which inlet ports 24 and 25 for gas and liquid and an outlet port 26 for gas and liquid are formed.

The microfabricated groove 12 formed in the board 11 has a width of 500 μm and a depth of 700 μm. The microfabricated groove 12 is divided at a midpoint into a plurality of grooves 12a arranged in parallel with each other. Each groove 12a also has a width of 500 μm and a depth of 700 μm. At ends of the grooves 12a, a counterbore 27 is formed that is deeper than the grooves 12a. The planar shape of the plural grooves 12a may not be parallel but zigzags or meandering shape.

In the middle plate 14, the flow path 13 and the supply path 23 for supplying the gas and liquid to the flow path 13 are formed. The planar surface of the flow path 13 is almost identical with that of the grooves 12a. The thickness of the middle plate 14 (height of the side wall) is greater than the depth of the microfabricated groove 12. Besides, the width and depth of the supply path 23 are greater than the width and depth of the microfabricated groove 12, respectively.

In the cover upper plate 15, a liquid inlet port 24 and gas inlet ports 25 are formed. The liquid inlet port 24 is interposed between a pair of the gas inlet ports 25. The liquid and gas pass through the same supply path 23 and then, are supplied to the flow path 13. As the liquid inlet port 24 is interposed between the gas inlet ports 25 in a pair, the liquid is supplied to the flow path 13 in such a manner that the liquid is sandwiched between the gases. The gas introduced into the flow path 13 is discharged from the outlet port 26. The liquid after reaction is also discharged from the outlet port 26. In this example, the outlet port 26 is used for both of gas and liquid.

The microchip 10 having grooves of 500 μm in width and 700 μm in depth formed in the bottom surface as illustrated in FIG. 4 was used to evaluate a time required for evaporation of the liquid. For comparison, the same operation was performed on a microchip with no groove formed. The liquid used was a solution 200 μL of acetonitrile and water in a 1:1 ratio. The gas used is nitrogen gas.

The solution of acetonitrile and water was introduced via the fluid inlet port 24 of the microchip 10 and pooled in the microfabricated groove 12. A heater was placed on the upper surface and lower surface of the microchip 10, its temperature was set to 120° C. (centigrade) and evaporation was performed while the nitrogen gas was made to flow via the gas inlet ports 25 at 100 mL/min. The evaporation was finished within one minute.

The like evaluation was performed with use of the microchip with no groove. The solution of acetonitrile and water was introduced via the liquid inlet path. Then, the solution was supplied in bulks and discharged via the outlet port, and could not be pooled in the microchip. Next, a gas permeation membrane was provided at the outlet path, a solution of acetonitrile and water was introduced and pooled in the microchip. Then, the evaporation was performed under the same conditions. It took seven minutes until the operation was finished.

The present application is based on Japanese Patent Application No. 2007-285012 filed on Nov. 1, 2007, and its contents are incorporated by reference herein.

The invention claimed is:

1. A microchip comprising:
   a gas flow path, which is operable of being in fluid communication with a gas source disposed outside of the microchip, and
   a pool portion which is operable of being in fluid communication with a liquid source disposed outside of the microchip, the pool portion being formed at a bottom of the gas flow path for pooling liquid that is dispersed by capillary action and being open into the gas flow path over the pool portion, the pool portion comprising:

at least one groove formed in a bottom surface of the gas flow path for a liquid to flow in, and a counterbore is provided at the downstream side end of the at least one groove, the counterbore being wider than the at least one groove, and the pool portion being operable to evaporate at least a part of a liquid pooled in the groove of the pool portion into a space of the gas flow path, the pool portion being configured so that the liquid does not flow into the counterbore of the pool portion and remains in the groove of the pool portion due to the surface tension when the liquid is evaporated.

2. The microchip of claim 1, wherein the at least one groove comprises a plurality of grooves arranged in parallel with each other.

3. The microchip of claim 1, further comprising a board in which the at least one groove is formed, the board having side walls each provided on an upper surface of the board and a cover provided on an upper surface of the side wall, and the board; the side walls and the cover make up the gas flow path.

4. A microchip of claim 1, wherein the liquid is a solution in which a solute is dissolved in a solvent, and the solvent pooled in the pool portion is evaporated to be dry and to harden the solute in the pool portion.

5. The microchip of claim 1, wherein when the liquid is a polar solvent; and at least a part of the gas flow path is subjected to a hydrophobic treatment.

6. The microchip of claim 1, wherein when the liquid is a polar solvent; and at least a part of the pool portion is subjected to a hydrophilic treatment.

7. The microchip of claim 1, wherein when the liquid is a nonpolar solvent; and at least a part of the gas flow path is subjected to a hydrophilic treatment.

8. The microchip of claim 1, wherein when the liquid is a nonpolar solvent; and at least a part of the pool portion is subjected to a hydrophobic treatment.

9. The microchip device of claim 1, further comprising a fluid control mechanism for supplying the gas or the liquid to the microchip; and the liquid pooled in the pool portion being evaporated while the gas is made to flow into the gas flow path.

10. The microchip device of claim 1, further comprising a heating mechanism for heating at least a part of the microchip; and the liquid pooled in the pool portion being evaporated while heating at least the part of the microchip.

11. The microchip device of claim 1, further comprising a vacuum suction mechanism for removing gas in the gas flow path of the microchip by suction; and the liquid pooled in the pool portion being evaporated while removing the gas in the gas flow path by suction.

12. An evaporation method comprising the steps of:

flowing a gas from a gas source disposed outside of a microchip according to claim 1 to a gas flow path formed in the microchip;

flowing a liquid from a liquid source disposed outside of the microchip to a pool portion formed at a bottom of the gas flow path for pooling the liquid that is dispersed by capillary action in the microchip, the pool portion being open into the gas flow path over the pool portion; and evaporating at least a part of the liquid pooled in the pool portion, the pool portion being configured so that the liquid remains in the pool portion due to the surface tension when the liquid is evaporated.

13. The evaporation method of claim 12, wherein while the liquid pooled in the pool portion is evaporated, gas is introduced into the gas flow path and made to flow in the gas flow path.

14. The evaporation method of claim 12, wherein while the liquid pooled in the pool portion is evaporated, at least a part of the microchip is heated.

15. The evaporation method of claim 12, wherein while the liquid pooled in the pool portion is evaporated, gas in the gas flow path of the microchip is removed by suction.

16. A method for producing a solution of a radiolabelled compound, comprising the steps of:

supplying a first solution which comprises a radioactive compound;

flowing the first solution through an inlet port to a pool portion formed in a microchip according to claim 1;

pooling the first solution in the pool portion;

flowing a gas through a gas flow path formed above the pool portion in the microchip, the pool portion being open into the gas flow path; and evaporating at least a part of the first solution pooled in the pool portion.

17. The method of claim 16, further comprising drying and hardening the first solution in the pool portion.

18. The method of claim 16, further comprising removing a first solvent from the first solution.

19. The method of claim 18, further comprising introducing a second solvent into the pool portion to exchange the first solvent.

20. The method of claim 18, further comprising introducing a second solution into the pool portion to react radioactive chemical material pooled in the pool portion with the second solution.

21. The method of claim 18, further comprising distilling the first solution in the pool portion.

22. The microchip of claim 1, wherein a liquid outlet port is not formed at the pool portion.

23. The microchip of claim 1, further comprising at least one outlet configured so that both gas and liquid flow out from the microchip.

* * * * *